United States Patent
Brown

(10) Patent No.: US 7,675,978 B2
(45) Date of Patent: *Mar. 9, 2010

(54) TRANSFORMER DATA COUPLER WITH HIGH COMMON MODE IMMUNITY

(75) Inventor: Dave Brown, Carp (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/185,011

(22) Filed: Aug. 1, 2008

(65) Prior Publication Data

US 2008/0285662 A1 Nov. 20, 2008

Related U.S. Application Data

(63) Continuation of application No. 10/991,491, filed on Nov. 19, 2004, now Pat. No. 7,424,060.

(51) Int. Cl.
*H04B 3/00* (2006.01)
(52) U.S. Cl. .................................................. 375/258
(58) Field of Classification Search ................ 375/257, 375/258; 327/11, 86, 168, 177; 330/276, 330/154, 165, 188, 190, 195, 197; 340/538.16, 340/646; 455/279.1, 292
See application file for complete search history.

(56) References Cited

U.S. PATENT DOCUMENTS

| | | | |
|---|---|---|---|
| 6,087,882 | A | 7/2000 | Chen et al. |
| 6,519,339 | B1 * | 2/2003 | Sacca et al. ................. 379/412 |
| 6,687,286 | B1 | 2/2004 | Leonowich et al. |
| 6,911,746 | B2 * | 6/2005 | Orr et al. ..................... 307/107 |
| 7,203,851 | B1 | 4/2007 | Lo et al. |

* cited by examiner

*Primary Examiner*—Sam K Ahn
(74) *Attorney, Agent, or Firm*—Blakely Sokoloff Taylor & Zafman, LLP

(57) ABSTRACT

A data coupler includes a transformer having primary and secondary windings, a data transmitter coupled to the primary winding of the transformer, and a data receiver coupled to the secondary winding. The data transmitter includes a first driver and a second driver having outputs coupled to respective ends of the primary winding. The first driver is responsive to a data signal and the second driver is responsive to a delayed version of the data signal, such that the primary winding is supplied with pulses representing a difference between the data signal and the delayed version of the data signal. The data coupler also includes an ac (alternating current) path to ground from the secondary winding for conducting to ground common mode signals coupled to the secondary winding via an interwinding capacitance of the transformer.

10 Claims, 2 Drawing Sheets

TRANSFORMER DATA COUPLER WITH HIGH COMMON MODE IMMUNITY

CROSS-REFERENCE TO RELATED APPLICATION

The present application is a continuation of U.S. patent application Ser. No. 10/991,491, entitled "TRANSFORMER DATA COUPLER WITH HIGH COMMON MODE IMMUNITY", and filed on Nov. 19, 2004, which issued as U.S. Pat. No. 7,424,060, on Sep. 9, 2008.

FIELD OF INVENTION

This invention relates to transformer data couplers, and is particularly concerned with a transformer data coupler which provides a relatively high immunity to common mode noise or interference.

BACKGROUND

It is often required to couple data from a first or primary circuit to a second or secondary circuit in a manner to maintain an electrical isolation between the primary and secondary circuits. Typically, this is carried out using either an opto-coupler or a transformer.

An example of such a data coupling requirement is in providing, to a control unit on the secondary or output side of an isolating switch-mode power supply (SMPS), data relating to monitoring of an input voltage and/or current supplied from a power source to the primary side of the SMPS. For example, the power source may be a 48 volt battery supply of a telephone central office.

Especially in such an example, in which a low operating voltage for the primary side monitoring and data transmission circuits may be derived from the 48 volt supply using a voltage-dropping resistor or a linear voltage regulator, it is desirable for the data transmission circuit to operate at a low current. A low cost and small size for the data coupling components are also desirable. Opto-couplers can have a relatively high current requirement and a relatively high cost, and accordingly transformer data coupling may be preferred.

It is therefore desirable to provide a low cost and low power transformer data coupler.

Common mode immunity of such a data coupler is also an important consideration. For example, it is desirable for the data coupler to accommodate electrical fast transients (EFTs) having a rise time of the order of 100 kV/µs (much more than the order of 10 kV/µs for the best opto-couplers) with a peak of the order of 4 kV. Accordingly, it is necessary for a data coupler to have a high common mode immunity, so that such EFTs, which can be coupled to the secondary circuit via the inter-winding capacitance of the transformer, do not cause damage to the data receiver or other parts of the data coupler. Although such common mode transients may result in bit errors in the data coupled via the data coupler, recovery from such errors is relatively easily provided using well-known data communication techniques.

There is therefore a need to provide a transformer data coupler having high common mode immunity, low cost, low power requirements, and small size.

SUMMARY OF THE INVENTION

One aspect of this invention provides a data coupler comprising: a transformer having primary and secondary windings; a data transmitter comprising two drivers having outputs coupled to respective ends of the primary winding, the two drivers being responsive to a data signal and a delayed version of the data signal, respectively, whereby the primary winding is supplied with narrow pulses of opposite polarity representing respective transitions of the data signal; a data receiver; a low pass filter coupling the secondary winding to an input of the data receiver, the data receiver being responsive to a signal supplied thereto from the secondary winding via the low pass filter to determine the data signal; and an ac path to ground from the secondary winding for conducting to ground common mode signals coupled to the secondary winding via an inter-winding capacitance of the transformer.

In an embodiment of the invention, the transformer has a primary to secondary turns ratio of N:1 where N is greater than one; the ac path to ground is coupled to one end of the secondary winding, whereby common mode currents in the drivers are unequal; and the drivers are scaled with a ratio (N−1):(N+1) to substantially equalize voltage drops in the drivers due to the unequal common mode currents.

Preferably each of the drivers comprises a CMOS output stage. The low pass filter conveniently comprises a series resistor and an input capacitance of the data receiver. The data receiver can conveniently comprise two comparators each arranged to compare a signal derived from the input of the data receiver with a respective threshold level, and a flip-flop arranged to be set and cleared by respective outputs of the comparators to determine the data signal at an output of the flip-flop.

In order to facilitate use of a very small transformer, the delayed version of the data signal can be delayed relative to the data signal by less than about 1 µs, preferably less than about 200 ns. The pulse width of each of the narrow pulses supplied to the transformer corresponds to this delay, and making the delay small reduces the energy supplied to the transformer, so that a smaller transformer can be used without saturation.

In another embodiment of the invention, the secondary winding has a center tap which is coupled to ground to provide the ac path to ground, and two ends which are coupled to respective inputs of the data receiver via respective low pass filters.

For increased isolation, the outputs of the two drivers can be coupled to the respective ends of the primary winding via respective series capacitors.

Another aspect of the invention provides a data coupler comprising: a transformer having primary and secondary windings and a primary-to-secondary turns ratio of N:1 where N is greater than one; two CMOS drivers each having an output coupled to a respective end of the primary winding of the transformer, one of the drivers being responsive to a delayed version of a data signal supplied to the other driver whereby the primary winding is supplied with narrow pulses of opposite polarity corresponding to respective edges of the data signal; and a data receiver, the secondary winding of the transformer being coupled between an input of the data receiver and a ground path for ac; wherein the CMOS drivers are scaled with a ratio (N−1):(N+1) to substantially equalize voltage drops in the drivers due to unequal common mode currents in the drivers.

A further aspect of the invention provides a method of increasing common mode immunity in a data coupler in which narrow pulses of opposite polarity, representing opposite edges of a binary data signal to be coupled via the data coupler, are supplied to a primary winding of a transformer using two drivers each coupled to a respective end of the primary winding, and a secondary winding of the transformer is coupled between a ground path for ac and an input of a data receiver for recovering the data signal, comprising the steps of providing a primary-to-secondary turns ratio of the transformer of N:1 where N is greater than one, and scaling the drivers in a ratio (N−1):(N+1) to substantially equalize voltage drops in the drivers due to unequal common mode currents in the drivers.

This method can further comprise the step of low pass filtering a signal supplied from the secondary winding of the transformer to the data receiver.

The invention further provides a method of increasing common mode immunity in a data coupler in which narrow pulses of opposite polarity, representing opposite edges of a binary data signal to be coupled via the data coupler, are supplied to a primary winding of a transformer using two drivers each coupled to a respective end of the primary winding, and a secondary winding of the transformer is coupled to an input of a data receiver for recovering the data signal, comprising the step of low pass filtering a signal supplied from the secondary winding of the transformer to the data receiver.

BRIEF DESCRIPTION OF THE DRAWINGS

The invention will be further understood from the following description by way of example with reference to the accompanying drawings, in which.

DETAILED DESCRIPTION

Figure 1:
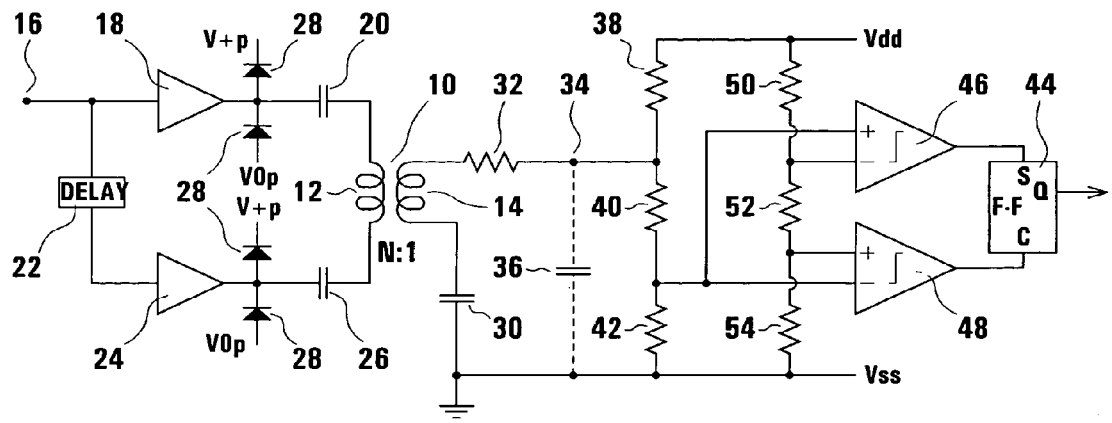
FIG. 1 schematically illustrates a data coupler in accordance with an embodiment of this invention.

Referring to the drawings, FIG. 1 illustrates a data coupler in accordance with an embodiment of this invention, including a transformer 10 having a primary winding 12 and a secondary winding 14 with a primary-to-secondary turns ratio of N:1. In this embodiment the value N is greater than one, so that the transformer is a step-down transformer from its primary to its secondary. For example N can be 2 as described further below.

A data signal at an input terminal 16 is coupled to one end of the primary winding 12 via a buffer or driver 18, having a CMOS output stage as described further below, and a series capacitor 20. The data signal at the input terminal 16 is also supplied to a delay element 22 which produces a delayed data signal at its output. The delayed data signal is coupled to the other end of the primary winding 12 via a buffer or driver 24, similar to the driver 18, and a series capacitor 26, similar to the capacitor 20. The series capacitors 20 and 26 are both optionally provided to supplement the electrical isolation provided by the transformer 10, and these capacitors can be omitted.

FIG. 1 also illustrates voltage limiting or clamping diodes 28 which are connected between the output of each of the drivers 18 and 24 and primary-side supply voltages V+p and V0p for the drivers. These diodes are provided optionally and in known manner to limit voltage swings at the outputs of the drivers substantially to the supply voltage range of the drivers 18 and 24, and these diodes can also be omitted. For example the supply voltage V0p (zero volts) may be connected to a primary side ground (not shown), and the supply voltage V+p may have a nominal value of +3.3 volts relative to this.

By way of example, the data signal can be a pulse width modulated binary signal in which a binary or logic 0 is represented by a high level for one quarter of a bit period followed by a low level for three-quarters of the bit period, and a binary or logic 1 is represented by a high level for three-quarters of the bit period followed by a low level for one quarter of the bit period, as described further below with reference to FIG. 2. The data signal can have a bit rate of for example 15 to 45 kbps, corresponding to a bit period of about 20 to about 70 μs. The delay element 22 can provide a delay which is less than about 1 μs, preferably less than about 200 ns, and for example can be in a range of about 75 ns to about 150 ns. This information is given purely by way of example and not by way of limitation, and it will be appreciated that other forms and timings of the data signal and the delay element may be provided as may be desired.

On the secondary side of the transformer 10 in FIG. 1, one end of the secondary winding 14 is connected via a capacitor 30 to a secondary side ground, to which a secondary side voltage supply line Vss (zero volts) is also connected, and the other end of the secondary winding 14 is connected via a series resistor 32 to an input 34 of a data receiver which is also supplied with a positive supply voltage Vdd. The receiver has an input capacitance, represented by a capacitor 36 with a dashed-line connection between the input 34 and the supply voltage Vss, which with the series resistor 32 forms a low-pass noise filter. For example for the data characteristics described above, and with the input capacitance represented by the capacitor 36 being of the order of about 6 to about 10 pF, the resistor 32 may have a resistance of the order of 1 kΩ.

The data receiver includes a potential divider comprising three resistors 38, 40, and 42 connected between the supply voltages Vdd and Vss. The resistors 40 and 42 have equal resistances R, and the resistor 38 has a resistance 2R, so that a junction between the resistors 38 and 40, to which the input 34 is connected, has a dc potential of Vdd/2, and a junction between the resistors 40 and 42 has a dc potential of Vdd/4.

The data receiver also includes a flip-flop 44, an output Q of which provides an output data signal from the data coupler, two comparators 46 and 48 having outputs connected to an asynchronous set input S and an asynchronous clear input C, respectively, of the flip-flop 44, and resistors 50, 52, and 54 connected in series between the supply voltages Vdd and Vss. The junction between the resistors 40 and 42 is connected to the non-inverting input of the comparator 46, whose inverting input is connected to a junction between the resistors 50 and 52 at an upper threshold voltage V+. The junction between the resistors 40 and 42 is also connected to the inverting input of the comparator 48, whose non-inverting input is connected to a junction between the resistors 52 and 54 at a lower threshold voltage V−. For example the threshold voltages V+ and V− can be about 0.5 volt above and below, respectively, the voltage Vdd/4. For example, Vdd can be 3.3 volts.

It will be appreciated that the resistors 38, 40, and 42 provide the data signal supplied to the comparators 46 and 48 with a voltage range from about zero volts to Vdd/2, for comparison in the comparators 46 and 48 with the threshold voltages V+ and V− above and below Vdd/4. It will also be appreciated that, to reduce dependence of the comparator threshold voltages on the supply voltage Vdd, the resistors 38 and 50 could be connected to a stable voltage source rather than to the supply voltage Vdd.

Figure 2:
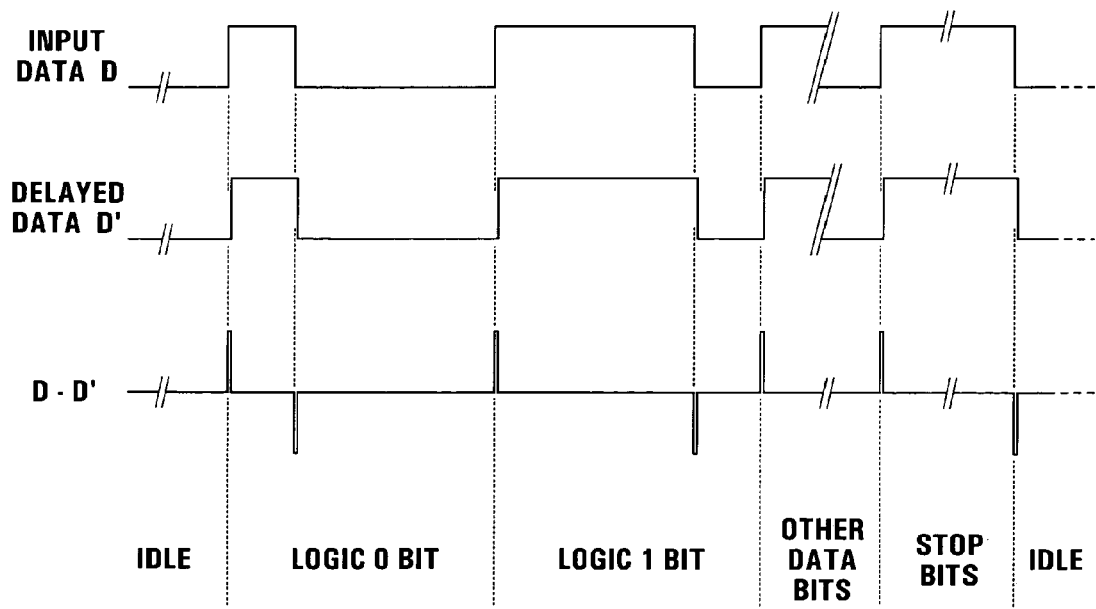
FIG. 2 illustrates signal waveforms which can occur in operation on the primary side of the data coupler of FIG. 1.

FIG. 2 illustrates by way of example signal waveforms which can occur in operation on the primary side of the data coupler of FIG. 1. From top to bottom, FIG. 2 shows an input data signal D which can be supplied to the input terminal 16, a delayed data signal D' produced at the output of the delay element 22, a difference signal D-D' corresponding to a differential voltage consequently supplied to the primary winding 12 of the transformer 10, and indications of idle states, logic 0, logic 1, and stop bits represented by the data.

As shown in FIG. 2, a steady low level of the data signal D represents an idle state in which no information is communicated, and a steady high level represents stop bits which indicate the end of a sequence of data bits. Following the idle state and before the stop bits, the data signal D can comprise an arbitrary number of bits each of which can be either logic 0 or logic 1. For simplicity, FIG. 2 shows only two such bits, a logic 0 bit followed by a logic 1 bit, in respective bit periods, having the form already described above, i.e. being high for the first quarter or the first three-quarters, respectively, of the bit period and being low for the remainder of the respective bit period.

By way of example, the data signal may comprise frames each comprising 64 data bits followed an 8-bit CRC, each frame being preceded by from 8 to 128 idle bit periods and being terminated with 8 stop bit periods. However, any other data signal format that may be desired may be used.

The delayed data signal D' is the same as the data signal D except that it is delayed by the fixed delay, for example about 100 ns, of the delay element 22. Consequently, the difference signal D-D' which is supplied to the primary winding 12 of the transformer 10 comprises narrow pulses of opposite polarity, each positive-going pulse representing a low-to-high transition or positive edge of the data signal and having a duration equal to the delay of the delay element 22, and each negative-going pulse representing a high-to-low transition or negative edge of the data signal and also having a duration equal to the delay of the delay element 22.

The narrow pulses of the difference signal D-D' applied to the transformer 10, representing communication of the data signal edges via the data coupler, have not only the desirable result of a low power requirement for the primary circuits of the data coupler, but also the advantage that a very small transformer can be used without saturation of the transformer core. For example, the transformer 10 can be a very low-cost and small transformer, such as Sumida Corporation type ESMIT-4153 with the windings providing the 2:1 ratio as described above, which has a surface mount package having a total size less than 10 by 6 by 3 mm. The transformer 10 can, however, be of any other desired type and form.

Figure 3:
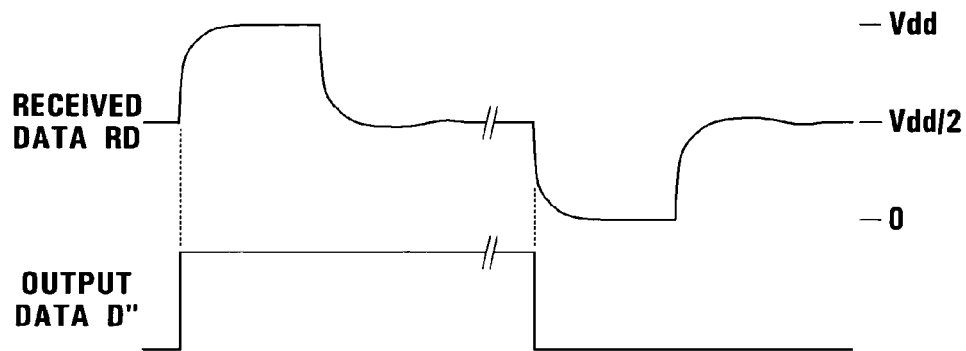
FIG. 3 illustrates in more detail signal waveforms which can occur in operation on the secondary side of the data coupler of FIG. 1.

FIG. 3 shows signal waveforms which can occur in operation on the secondary side of the data coupler of FIG. 1, this figure illustrating, to a greater scale than FIG. 2, opposite pulses of a received data signal RD at the input 34 of the data receiver, and a resulting output data signal D" produced at the Q output of the flip-flop 44. It will be appreciated that this output data signal D" corresponds substantially to the data signal D supplied to the input 16 of the data coupler, and can be sampled and the data recovered in any known manner, for example using a data decoder (not shown) to which the output data signal D" is supplied.

Referring to FIG. 3, alternate pulses of the received data signal RD extend above and below the dc level Vdd/2 of the data receiver input 34 established by the resistors 38, 40, and 42, with substantially the same timing as the difference signal D-D' supplied to the transformer primary winding 12 as described above. The amplitude of each received data signal pulse is about half that of amplitude of pulses of the difference signal D-D', due to the 2:1 ratio of the transformer 10. The pulse edges are slowed by the low pass filter constituted as described above by the resistor 32 and capacitance 36, this filter serving to improve noise immunity of the data coupler. An overshoot past the dc level Vdd/2 at the end of each pulse is caused by magnetizing current of the transformer flowing into the capacitors 20 and 26.

As will be appreciated from the above description, the amplitude of the received data signal RD is halved by the resistors 40 and 42, and the result is compared with the thresholds V+ and V− by the comparators 46 and 48, to set and clear the flip-flop 44 to produce the signal D" as shown in FIG. 3.

As discussed above, the data coupler is desired to accommodate electrical fast transients or EFTs of the order of 100 kV/μs, for which the common mode immunity of the data coupler is important. Even faster EFTs may cause bit errors in the coupled data, which must be detected and from which the data coupler and data detector must be able to recover, for example by detecting an incorrect CRC, timing of the coupled data, or idle and/or stop bit periods. However, such transients must not cause damage to the primary or secondary circuits, which are for example implemented using integrated circuits. In addition to the arrangements described here, known measures, such as the provision of the clamping diodes 28 to protect the outputs of the drivers 18 and 24 as described above with reference to FIG. 1, can be taken in this respect.

The behaviour of the coupler of FIG. 1 in the presence of common mode noise is explained below with reference to a common mode equivalent circuit shown in FIG. 4.

Figure 4:
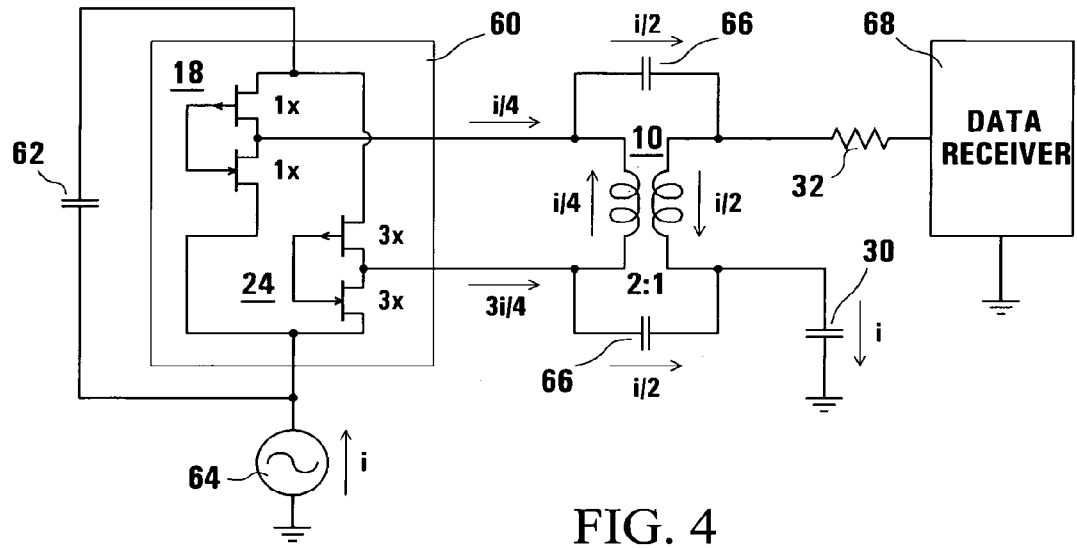
FIG. 4 is an equivalent circuit diagram with reference to which behaviour of the coupler of FIG. 1 in the presence of common mode noise is explained.

In FIG. 4, the primary side circuits of the data coupler of FIG. 1 are represented by a block 60, in which only the CMOS output stages of the drivers 18 and 24 are shown. Each such output stage comprises complementary MOSFETs coupled in series between the primary voltage supplies, which for common mode purposes are shown in FIG. 4 as coupled together via a supply capacitance 62. A common mode voltage source 64 is illustrated as being provided between the primary zero volt supply rail and ground. Junctions between the complementary MOSFETs of the driver output stages constitute the outputs of the drivers and couple common mode signals directly to the primary winding of the transformer 10 as shown in FIG. 4. FIG. 4 also shows inter-winding capacitances 66 between the primary and secondary windings of the transformer 10. On the secondary side, FIG. 4 shows the capacitor 30 to ground, the series resistor 32, and the data receiver represented by a block 68.

The common mode voltage source 64 produces a current of i=C(dV/dt), where dV/dt is the rate of change of the common mode voltage and C is the inter-winding capacitance of the transformer 10, shown split into two halves in FIG. 4. For example, with C=4 pF and (dV/dt)=100 kV/μs as discussed above, i=400 mA. This current flows equally in the capacitances 66 so that each capacitance 66 passes a common mode current of i/2, these currents flowing to ground via the capacitor 30. As a result, the transformer secondary winding 14 passes a current of i/2 downwardly as shown in FIG. 4. This forces a current of i/4 (halved due to the 2:1 turns ratio of the transformer) to flow upwardly in the transformer primary winding, again as shown in FIG. 4. Consequently, the common mode current from the drivers 18 and 24 is divided unequally, with a current i/4 flowing from the driver 18 and a current of 3i/4 flowing from the driver 24, again as indicated in FIG. 4.

In order for voltage drops in the drivers 18 and 24 to be substantially equal, so that no significant differential voltage (which could be potentially damaging) is created across the transformer primary winding, the output stages of the drivers 18 and 24 are scaled in the ratio 1:3, as shown in FIG. 4 by the designations 1× and 3× for these drivers. For a common mode current of i=400 mA, the driver 18 sources (or sinks, for the opposite common mode current direction) a current of i/4 or 100 mA, and the driver 24 sources (or sinks) a current of 3i/4 or 300 mA.

As shown in FIG. 2, most of the time the drivers 18 and 24 both provide the same output level, and their impedances will be closely matched. During the narrow pulses of the difference signal D-D', however, they provide different output levels, so that in one driver the impedance will be due to an N-channel resistance and in the other driver the impedance will be due to a P-channel resistance. These resistances do not match perfectly, but typical simulations have showed voltage differences at the data receiver input 34 arising from this mismatch less than about 200 mV.

More generally, it can be seen that for a transformer turns ratio of N:1, the output stages of the drivers 18 and 24 need to be scaled in the ratio (N−1):(N+1). From this it can be seen that the larger the step-down ratio of the transformer 10, i.e. the larger the value of N, the smaller is the scaling of the driver 24 relative to the driver 18. However, a larger value of N also reduces the amplitude of the data signal supplied to the data receiver, so that a data receiver of a different form from that described above with reference to FIG. 1 may be preferred.

Figure 5:
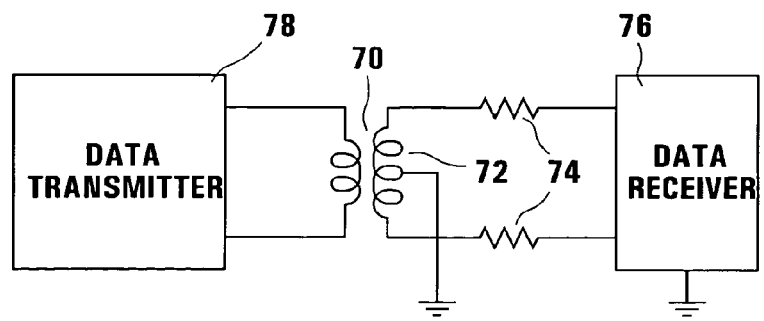
FIG. 5 schematically illustrates a data coupler in accordance with another embodiment of the invention.

In a data coupler according to another embodiment of the invention, as shown in FIG. 5 the transformer 10 is replaced by a transformer 70 having a center-tapped secondary winding 72, the center tap of which is connected directly to the secondary side ground, and the ends of which are connected via respective resistors 74, corresponding to the resistor 32 of FIG. 1, to respective inputs of a data receiver, shown in FIG. 5 as a block 76. In this case common mode currents to ground in the halves of the secondary winding 72 are equal and opposite, so that the common mode currents from the drivers in the data transmitter, shown in FIG. 5 as a block 78, to the transformer primary winding are equal and these drivers can have the same size, i.e. a 1:1 scale ratio. Correspondingly, the transformer 70 can have any desired turns ratio N which can be less than, equal to, or greater than one. However, this form of data coupler results in greater complexity for the data receiver 76 because it is supplied with bipolar data signals (i.e. positive and negative with respect to the secondary side ground). In addition, the center-tapped transformer 70 is larger and more costly than the transformer 10 described above.

Although particular forms of data coupler, particular forms and details of its component parts, and details of data characteristics are described above, it should be appreciated that these are all given by way of example only, and that the invention is not limited to these.

For example, the data coupler of FIG. 1 uses a particular arrangement of the data receiver, but it can be appreciated that the data receiver may have any desired form for deriving the transmitted data signal from the received data signal, and the invention is not limited to any particular form of data receiver. In addition, in the data receiver shown in FIG. 1 the resistors 38, 40, and 42 serve for establishing a dc level for the received data signal and reducing its amplitude. Alternatively, the dc level can be established by resistors connected on the transformer side of the resistor 32, and/or the amplitude of the received data signal may be otherwise matched to the range of the comparators, for example by voltage clipping at the supply voltages Vdd and Vss.

Further, it can be appreciated that the capacitor 30 in the data coupler of FIG. 1 only serves for dc isolation of the data receiver input 34 from ground. Accordingly, it can be connected between the secondary winding 14 and the resistor 32, or between the resistor 32 and the data receiver input 34, instead of being connected between the secondary winding 14 and the secondary side ground as shown in FIG. 1 and FIG. 4. It will be appreciated that for each of these connections there is an ac path to ground from one end (the lower end as shown in FIG. 1 and FIG. 4) of the secondary winding 14, so that in each case there will be unequal common mode currents in the drivers 18 and 24 as described above with reference to FIG. 4.

These and numerous other modifications, variations, and adaptations which may occur to those of ordinary skill in the art may be made without departing from the scope of the invention as defined in the claims.

The invention claimed is:

1. A data coupler comprising:
a transformer having primary and secondary windings;
a data transmitter, coupled to the primary winding of the transformer and comprising a first driver and a second driver having outputs coupled to respective ends of the primary winding, the first driver being responsive to a data signal and the second driver being responsive to a delayed version of the data signal, such that the primary winding is supplied with pulses representing a difference between the data signal and the delayed version of the data signal;
a data receiver coupled to the secondary winding; and
an ac (alternating current) path to ground from the secondary winding for conducting to ground common mode signals coupled to the secondary winding via an inter-winding capacitance of the transformer.

2. A data coupler as claimed in claim 1 wherein the transformer has a primary to secondary turns ratio of N:1 where N is a number greater than one; said ac path to ground is coupled to one end of the secondary winding, whereby common mode currents in the first driver and the second driver are unequal; and the first driver and the second driver are scaled with a ratio (N−1):(N+1) to substantially equalize voltage drops in the first driver and the second driver due to the unequal common mode currents.

3. A data coupler as claimed in claim 2 wherein each of the first driver and the second driver comprises a CMOS (complementary metal oxide semiconductor) output stage.

4. A data coupler as claimed in claim 2 further comprising a resistor coupled between the secondary winding and an input of the data receiver, wherein the resistor and an input capacitance of the data receiver form a low pass filter.

5. A data coupler as claimed in claim 2 wherein the data receiver comprises two comparators each arranged to compare a signal derived from an input of the data receiver with a respective threshold level, and a flip-flop arranged to be set and cleared by respective outputs of the comparators to determine the data signal at an output of the flip-flop.

6. A data coupler as claimed in claim 2 wherein the delayed version of the data signal is delayed relative to the data signal by less than about 1 μs.

7. A data coupler as claimed in claim 2 wherein the delayed version of the data signal is delayed relative to the data signal by less than about 200 ns.

8. A data coupler as claimed in claim 1 wherein the delayed version of the data signal is delayed relative to the data signal by less than about 1 μs.

9. A data coupler as claimed in claim 1 wherein the secondary winding has a center tap coupled to ground, wherein the ac path to ground includes the center tap coupled to ground, the secondary winding having two ends coupled to respective inputs of the data receiver via respective low pass filters.

10. A data coupler as claimed in claim 1 wherein the outputs of the first driver and the second driver are coupled to the respective ends of the primary winding via respective capacitors.

* * * * *